US012598451B2

(12) United States Patent
Jeong

(10) Patent No.: US 12,598,451 B2
(45) Date of Patent: *Apr. 7, 2026

(54) METHOD AND APPARATUS FOR L2 SL-BASED UE-TO-NETWORK RELAY OPERATIONS IN WIRELESS COMMUNICATION NETWORK

(71) Applicant: Samsung Electronics Co., Ltd., Suwon-si (KR)

(72) Inventor: Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

This patent is subject to a terminal disclaimer.

(21) Appl. No.: 18/419,429

(22) Filed: Jan. 22, 2024

(65) Prior Publication Data

US 2024/0163652 A1    May 16, 2024

Related U.S. Application Data

(63) Continuation of application No. 17/680,122, filed on Feb. 24, 2022, now Pat. No. 11,882,511.

(Continued)

(51) Int. Cl.
*H04W 4/90*        (2018.01)
*H04W 40/22*       (2009.01)
(Continued)

(52) U.S. Cl.
CPC .............. *H04W 4/90* (2018.02); *H04W 40/22* (2013.01); *H04W 48/08* (2013.01); *H04W 68/005* (2013.01)

(58) Field of Classification Search
CPC ....... H04W 4/90; H04W 40/22; H04W 48/08; H04W 68/005
(Continued)

(56) References Cited

U.S. PATENT DOCUMENTS

2012/0050331 A1    3/2012    Kanda
2013/0273907 A1    10/2013    Vikberg
(Continued)

FOREIGN PATENT DOCUMENTS

WO        2018194390 A1    10/2018

OTHER PUBLICATIONS

CATT: "user and control plane procedures for L2 UE-to-NW relay", 3GPP Draft; R2-2006610,3rd Generation partnership project, Mobile competence enter; 650, Route DES; F-06921 Sophia-Antipolis Cedex; R France (Year: 2020).*
(Continued)

*Primary Examiner* — Maria El-Zoobi

(57)        ABSTRACT

Methods and apparatuses for layer 2 (L2) sidelink (SL)-based user equipment (UE)-to-network relay operations in a wireless communication network. A method for operating a first UE includes receiving, from a second UE, a message including assistance information for a relay operation between the first UE and the second UE and receiving, from a base station (BS), a short message. The method further includes acquiring, based on information in the short message, first system information blocks including an earthquake and tsunami warning system/commercial mobile alert service (ETWS/CMAS) notification or second system information blocks for the second UE and transmitting, to the second UE over a sidelink channel, the acquired first system information blocks or the acquired second system information block.

15 Claims, 9 Drawing Sheets

Related U.S. Application Data

(60) Provisional application No. 63/154,431, filed on Feb. 26, 2021.

(51) Int. Cl.
H04W 48/08 (2009.01)
H04W 68/00 (2009.01)

(58) Field of Classification Search
USPC ...................................................... 455/404.1
See application file for complete search history.

(56) References Cited

U.S. PATENT DOCUMENTS

| | | | | |
|---|---|---|---|---|
| 2014/0359091 | A1 | 12/2014 | Senniappan | |
| 2015/0215757 | A1 | 7/2015 | Miskiewicz | |
| 2016/0165521 | A1 | 6/2016 | Choi | |
| 2018/0324571 | A1* | 11/2018 | Buckley | H04L 67/565 |
| 2019/0075447 | A1* | 3/2019 | Lee | H04W 68/02 |
| 2019/0261450 | A1 | 8/2019 | Adachi | |
| 2019/0333479 | A1 | 10/2019 | Maalouf | |
| 2019/0387498 | A1 | 12/2019 | Li et al. | |
| 2022/0167140 | A1* | 5/2022 | Shrestha | H04W 4/90 |
| 2022/0256337 | A1* | 8/2022 | Ohlsson | H04W 12/63 |
| 2022/0279332 | A1* | 9/2022 | Jeong | H04W 48/12 |
| 2023/0007624 | A1* | 1/2023 | Murray | H04W 68/005 |
| 2023/0032593 | A1* | 2/2023 | Chen | H04L 27/2613 |
| 2023/0075197 | A1* | 3/2023 | Xu | H04L 5/0048 |
| 2023/0116112 | A1* | 4/2023 | Du | H04W 48/08 |
| | | | | 370/329 |

OTHER PUBLICATIONS

Extended European Search Report issued Jul. 15, 2024 regarding Application No. 22760123.4, 17 pages.

Catt, "User and Control Plane Procedures for L2 UE-to-NW Relay", 3GPP Tsg-Ran WG2 Meeting #111-e, R2-2006610, Aug. 2020, 7 pages.

"3rd Generation Partnership Project; Technical Specification Group Radio Access Network; NR; Radio Resource Control (RRC) protocol specification (Release 16)", 3GPP TS 38.331, V16.3.1, Jan. 2021, 932 pages.

"5G; NR; Medium Access Control (MAC) protocol specification (3GPP TS 38.321 version 16.3.0 Release 16)", ETSI TS 138 321 V16.3.0, Jan. 2021, 158 pages.

"3rd Generation Partnership Project; Technical Specification Group Radio Access Network; NR; Radio Resource Control (RRC) protocol specification (Release 16)", 3GPP TS 38.331 V16.3.0, Dec. 2020, 932 pages.

"3rd Generation Partnership Project; Technical Specification Group Radio Access Network; NR; Study on NR Vehicle-to-Everything (V2X) (Release 16)", 3GPP TR 38.885 V16.0.0, Mar. 2019, 122 pages.

"3rd Generation Partnership Project; Technical Specification Group Radio Access Network; Study on further enhancements to LTE Device to Device (D2D), User Euipment (UE) to network relays for Internet of Things (IoT) and wearables; (Release 15)", 3GPP TR 36.746 V15.1.1, Apr. 2018, 55 pages.

"3rd Generation Partnership Project; Technical Specification Group Radio Access Network; Study on NR sidelink relay; (Release 17)", 3GPP TR 38.836 V0.1.0, Sep. 2020, 16 pages.

"5G; NR; User Equipment (UE) proccedures in idle mode and in RRC Inactive state (3GPP TS 38.304 version 16.3.0 Release 16)", ETSI TS 138 304 V16.3.0, Jan. 2021, 41 pages.

"3rd Generation Partnership Project; Technical Specification Group Radio Access Network; NR; Multiplexing and channel coding (Release 16)", 3GPP TS 38.212 v16.4.0, Dec. 2020, 152 pgs.

International Search Report and Written Opinion dated Jun. 14, 2022 regarding International Application No. PCT/KR2022/002807, 8 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.3.0, Dec. 2020, 1084 pages.

* cited by examiner

600

700

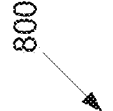
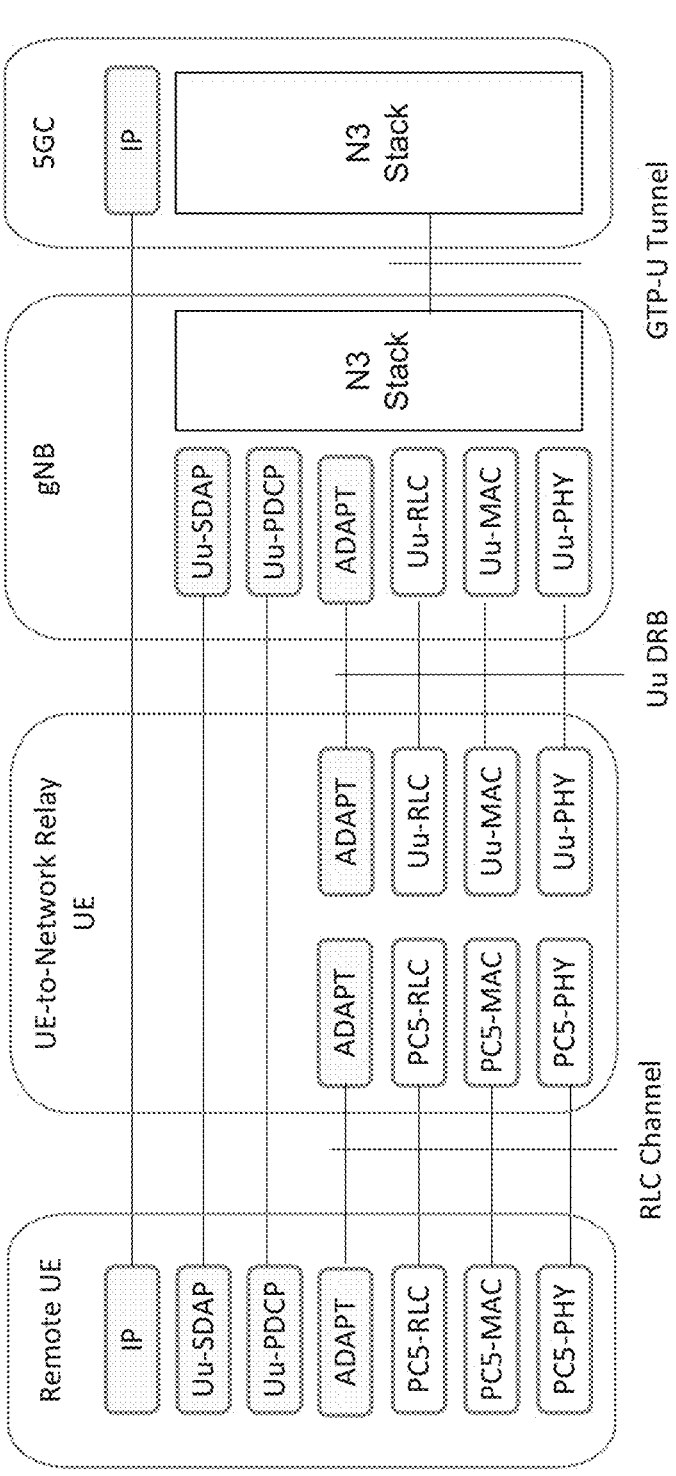
FIG. 8A

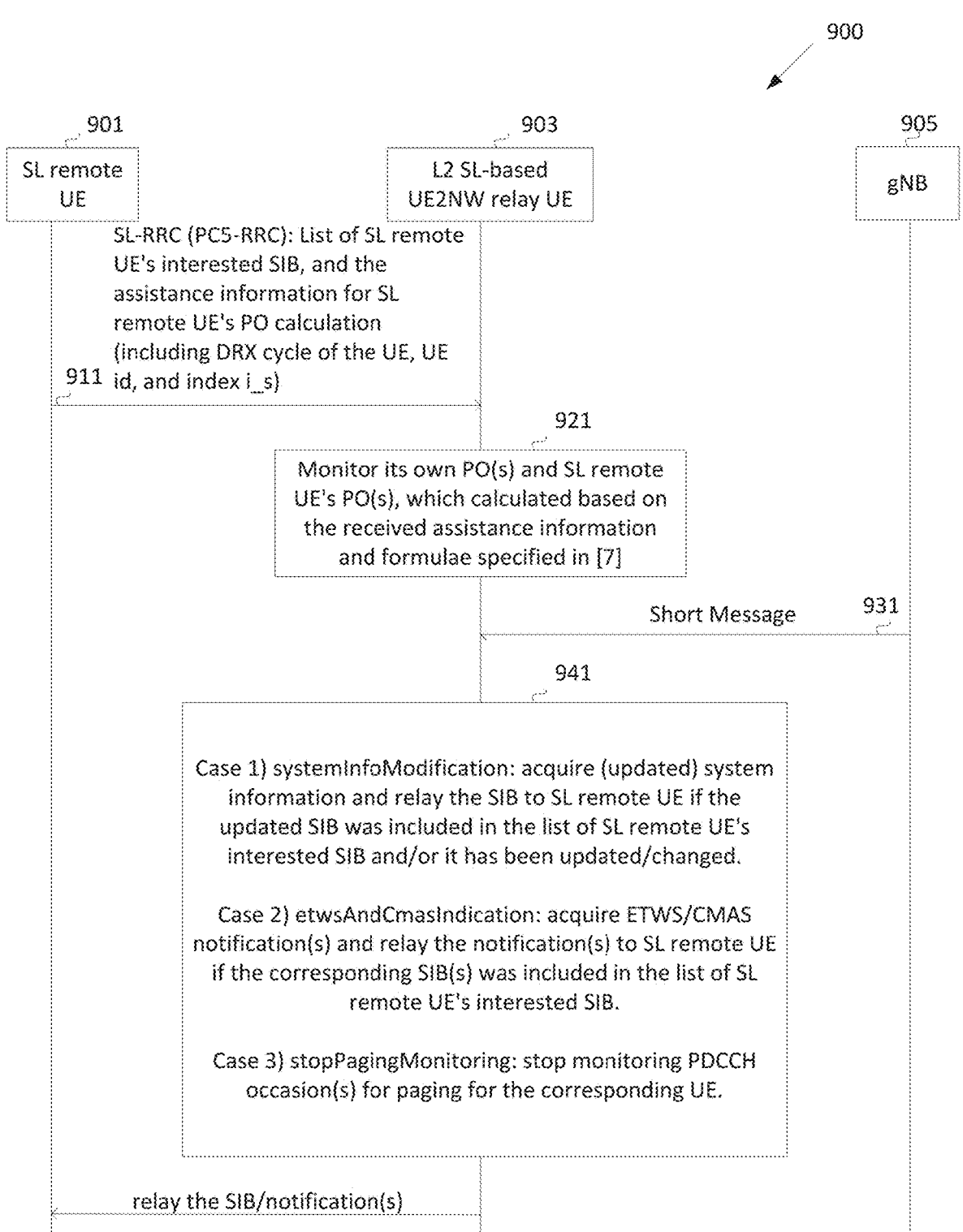

900

901                          903                              905

| SL remote UE | | L2 SL-based UE2NW relay UE | | gNB |

SL-RRC (PC5-RRC): List of SL remote UE's interested SIB, and the assistance information for SL remote UE's PO calculation (including DRX cycle of the UE, UE id, and index i_s)

911

921

Monitor its own PO(s) and SL remote UE's PO(s), which calculated based on the received assistance information and formulae specified in [7]

Short Message          931

941

Case 1) systemInfoModification: acquire (updated) system information and relay the SIB to SL remote UE if the updated SIB was included in the list of SL remote UE's interested SIB and/or it has been updated/changed.

Case 2) etwsAndCmasIndication: acquire ETWS/CMAS notification(s) and relay the notification(s) to SL remote UE if the corresponding SIB(s) was included in the list of SL remote UE's interested SIB.

Case 3) stopPagingMonitoring: stop monitoring PDCCH occasion(s) for paging for the corresponding UE.

relay the SIB/notification(s)

FIG. 9

METHOD AND APPARATUS FOR L2 SL-BASED UE-TO-NETWORK RELAY OPERATIONS IN WIRELESS COMMUNICATION NETWORK

CROSS-REFERENCE TO RELATED APPLICATIONS AND CLAIM OF PRIORITY

This application is a continuation of U.S. patent application Ser. No. 17/680,122, filed on Feb. 24, 2022, which claims priority to U.S. Provisional Patent Application No. 63/154,431, filed on Feb. 26, 2021. The content of the above-identified patent documents are incorporated herein by reference.

TECHNICAL FIELD

The present disclosure relates generally to wireless communication systems and, more specifically, the present disclosure relates to a layer 2 (L2) sidelink (SL)-based user equipment (UE)-to-network relay operation in a wireless communication network.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an L2 SL-based UE-to-network relay operation in a wireless communication network.

In one embodiment, a first user equipment (UE) in a wireless communication system is provided. The first UE includes a transceiver configured to receive, from a second UE, a message including assistance information for a relay operation between the first UE and the second UE, and receive, from a base station (BS), a short message. The first UE further includes a processor operably coupled to the transceiver. The processor is configured to acquire, based on information in the short message, first system information blocks including an earthquake and tsunami warning system/commercial mobile alert service (ETWS/CMAS) notification or second system information blocks for the second UE. The transceiver is further configured to transmit, to the second UE over a sidelink channel, the acquired first system information blocks or the acquired second system information blocks.

In another embodiment, a second UE in a wireless communication system is provided. The second UE includes a processor and a transceiver operably connected to the processor. The transceiver is configured to transmit, to a first UE over a sidelink channel, a message including assistance information for a relay operation between the first UE and the second UE and receive, from the first UE, first system information blocks including an ETWS/CMAS notification or second system information blocks for the second UE. The first system information blocks or the second system information blocks are received via the first UE from a base station.

In yet another embodiment, a method for operating a first UE in a wireless communication system is provided. The method includes receiving, from a second UE, a message including assistance information for a relay operation between the first UE and the second UE and receiving, from a BS, a short message. The method further includes acquiring, based on information in the short message, first system information blocks including an ETWS/CMAS notification or second system information blocks for the second UE and transmitting, to the second UE over a sidelink channel, the acquired first system information blocks or the acquired second system information block.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8A illustrates an example L2 SL-based UE-to-network relay user plane protocol architecture according to embodiments of the present disclosure;

FIG. 9 illustrates a signaling flow for SL-based UE-to-network relay operation according to embodiments of the present disclosure.

DETAILED DESCRIPTION

FIGS. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.321 v16.3.0, "Medium Access Control (MAC) protocol specification"; 3GPP TS 38.331 v.16.3.0, "Radio Resource Control (RRC) protocol specification"; and 3GPP TR 38.885 v.16.0.0, "Study on NR Vehicle-to-Everything (V2X)"; 3GPP TR 36.746: v.15.1.1., "Study on further enhancements to LTE Device to Device (D2D), User Equipment (UE) to network relays for Internet of Things (IoT) and wearables"; 3GPP TR 38.836 v. 0.1.0 "Study on NR sidelink relay"; 3GPP TS 38.304 v. 16.3.0 "User Equipment (UE) procedures in idle mode and RRC inactive state"; and 3GPP TS 38.212 v.16.4.0 "Multiplexing and channel coding."

Figure 1:
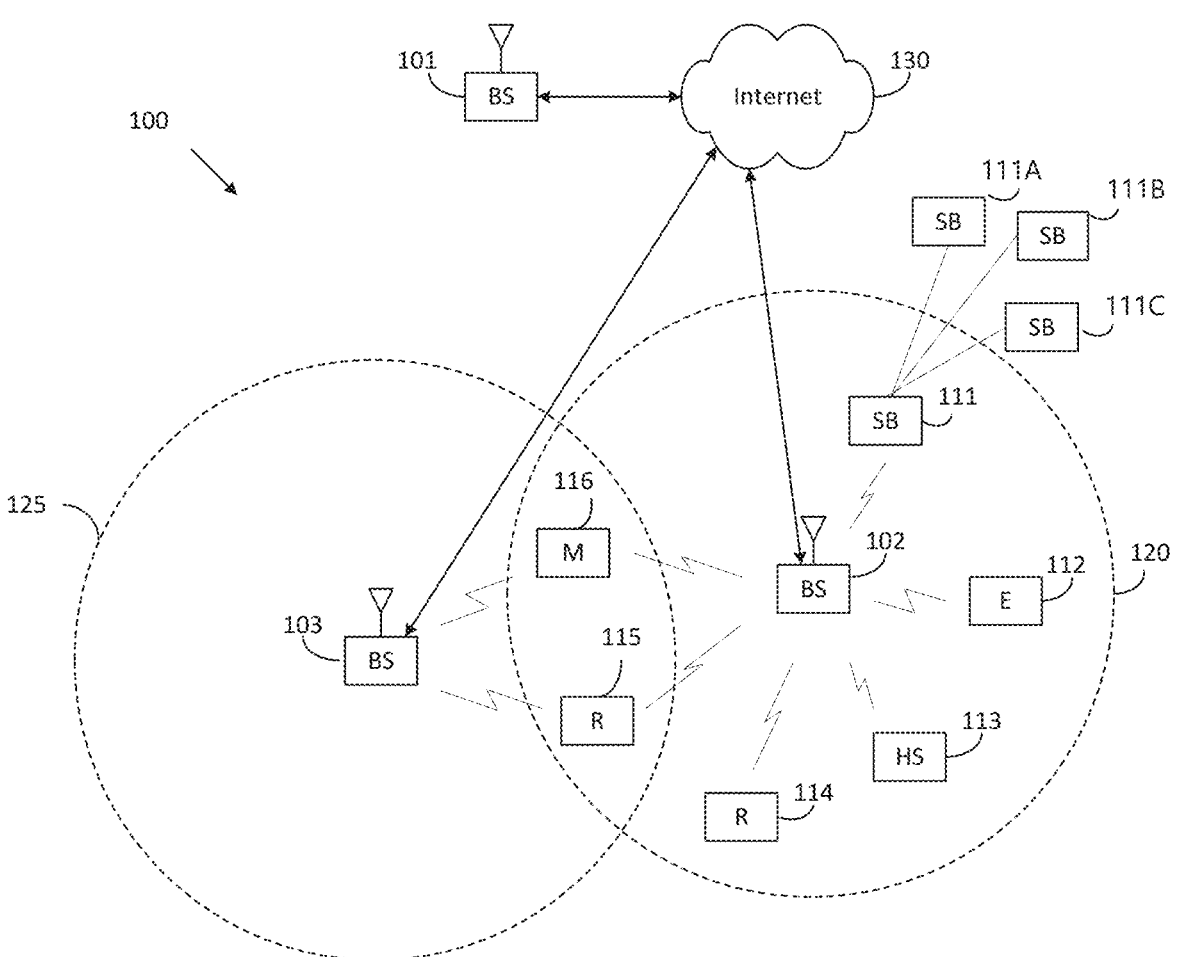
FIG. 1 illustrates an example wireless network according to embodiments of the present disclosure.
Figure 2:
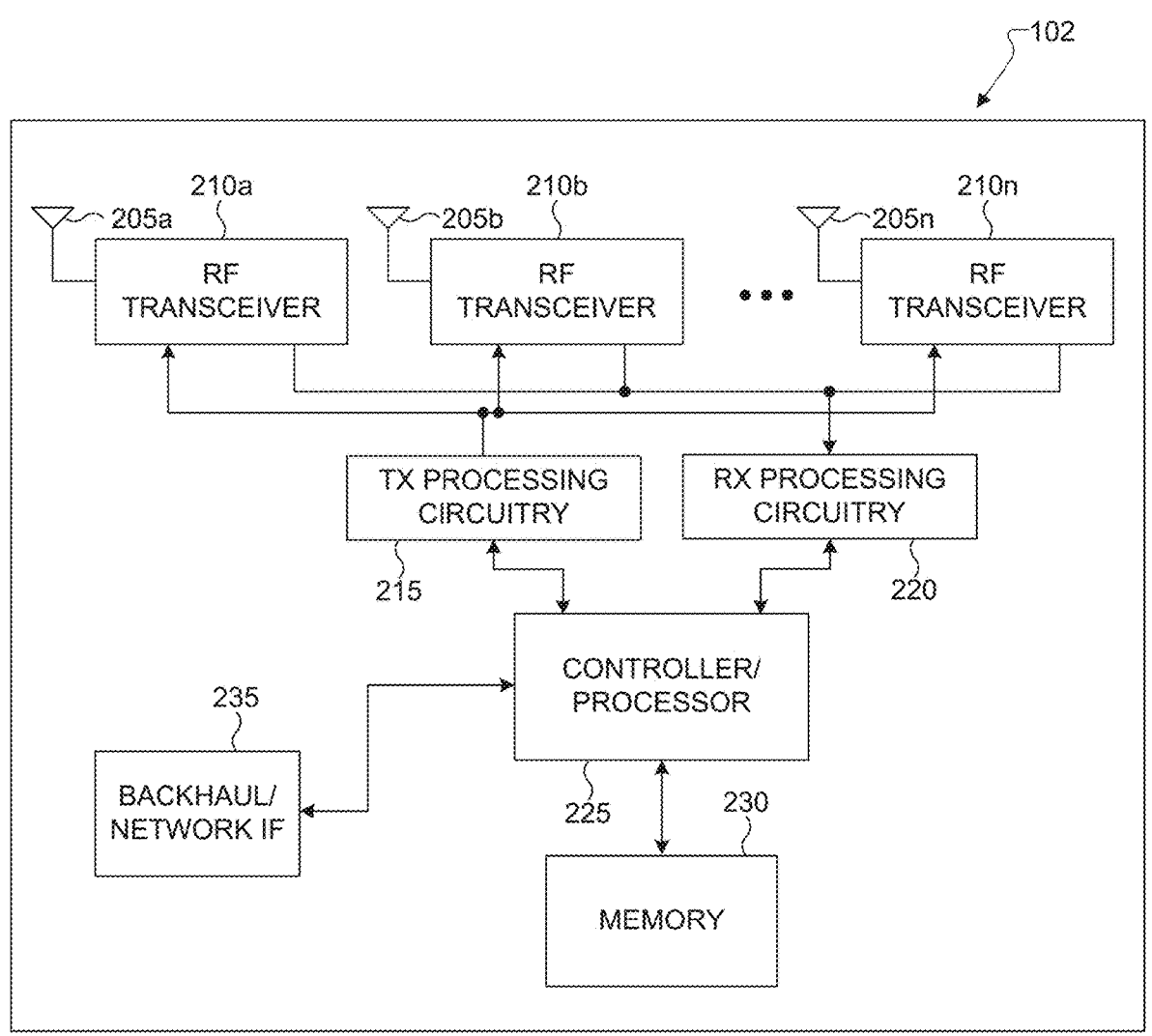
FIG. 2 illustrates an example gNB according to embodiments of the present disclosure.
Figure 3:
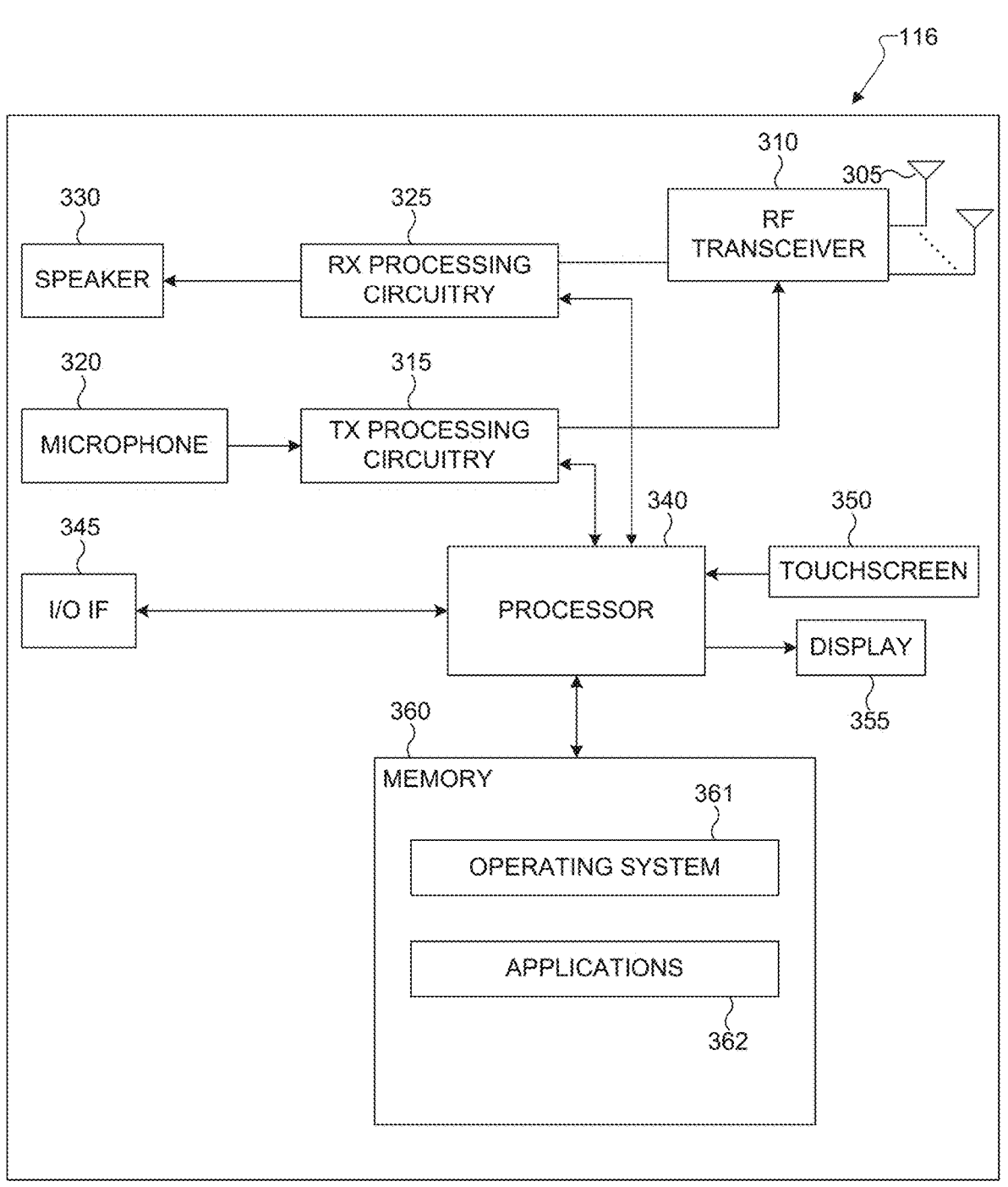
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for SL network assisted inter-UE coordination in a wireless communication system. In certain embodiments, and one or more of the gNBs 101-103 includes circuitry, programing, or a combination thereof, for SL network assisted inter-UE coordination in a wireless communication system.

As discussed in greater detail below, the wireless network 100 may have communications facilitated via one or more devices (e.g., SB 111A to 111C) that may have a SL communication with the SB 111. The SB 111 can communicate directly with the SBs 111A to 111C through a set of SLs (e.g., SL interfaces) to provide sideline communication, for example, in situations where the SBs 111A to 111C are remotely located or otherwise in need of facilitation for network access connections (e.g., BS 102) beyond or in addition to traditional fronthaul and/or backhaul connections/interfaces. In one example, the SB 111 can have direct communication, through the SL communication, with SBs 111A to 111C with or without support by the BS 102. Various of the UEs (e.g., as depicted by UEs 112 to 116) may be capable of one or more communication with their other UEs (such as UEs 111A to 111C as for SB 111).

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100 or by other UEs on the sidelink. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the enhanced resource allocation. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink and/or sidelink channel signals and the transmission of uplink and/or sidelink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for enhanced resource allocation. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points and a sidelink (SL) that refers to transmissions from one or more UEs to one or more UEs.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figures 4, 5:
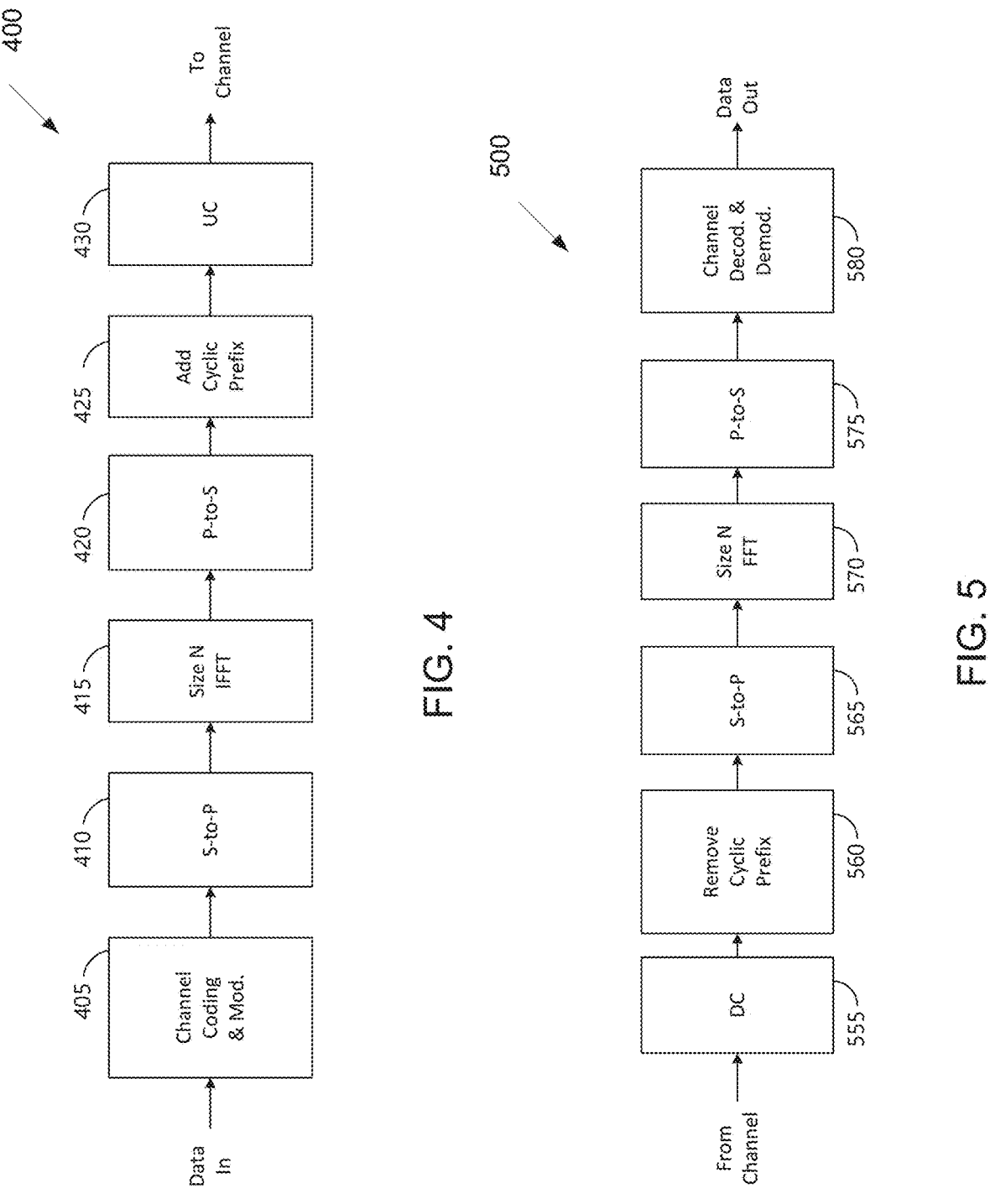
FIGS. 4 and 5 illustrate example wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support sidelink measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 3GPP wireless standards, NR has been being discussed as a 5G wireless communication. One of NR features under the discussion is V2X.

Figure 6:
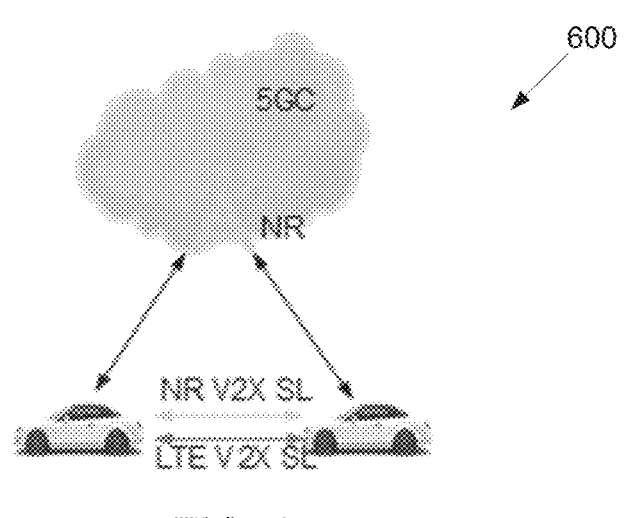
FIG. 6 illustrates an example V2X communication over sidelink according to embodiments of the present disclosure.

FIG. 6 illustrate an example V2X communication over sidelink 600 according to embodiments of the present disclosure. An embodiment of the V2X communication over sidelink 600 shown in FIG. 6 is for illustration only.

In 3GPP wireless communication system standards, new radio access technology (NR) has been specified as 5G wireless communication. One of NR feature is an SL communication, which enables a UE to UE direct communication without a network involvement. Typical example service using SL communication is vehicle-to-everything (V2X).

FIG. 6 illustrates the example of scenario of vehicle to vehicle communication. Two or multiple vehicles can transmit and receive data/control over a direct link/interface between vehicles. The direct link/interface between UEs is named as SL or PC5 interface in 3GPP, so "SL communication" is also commonly used with "V2X communication." Note that FIG. 6 describes a scenario where the vehicles still can communicate with a gNB in order to acquire SL resource, SL radio bearer configurations, etc., however it is also possible even without an interaction with a gNB, vehicles still communicate each other over SL. In the case, SL resource, an SL radio bearer configuration, etc. are preconfigured (e.g., via V2X server or any other core network entity).

In 3GPP Rel-16, the basic SL communication functionalities are supported. For Rel-17, it is planned to introduce more enhanced features into SL. One of Rel-17 features is to support a layer 2 (L2) SL-based UE-to-network relay operation. Note that a UE-to-network relay is also expressed as a UE2NW relay here. An L2 SL-based UE2NW relay UE receives packets destined to the SL remote UE in a DL from the gNB, which corresponds to RX (Reception) in the DL in the figure, and relays it in a SL to the SL remote UE, which corresponds to TX (Transmission) in SL in the figure. Also, an L2 SL-based UE2NW relay UE receives packets destined to the gNB in SL from the SL remote UE, which corresponds to RX in SL, and relays it in UL to the gNB, which corresponds to TX in UL in the figure. With an L2 SL-based UE2NW relay UE, the SL remote UE can communicate with gNB well even when the direct radio condition between the SL remote UE and gNB is poor. Note that an SL remote UE can be also located in the out-of-coverage of the cell.

Figure 7:
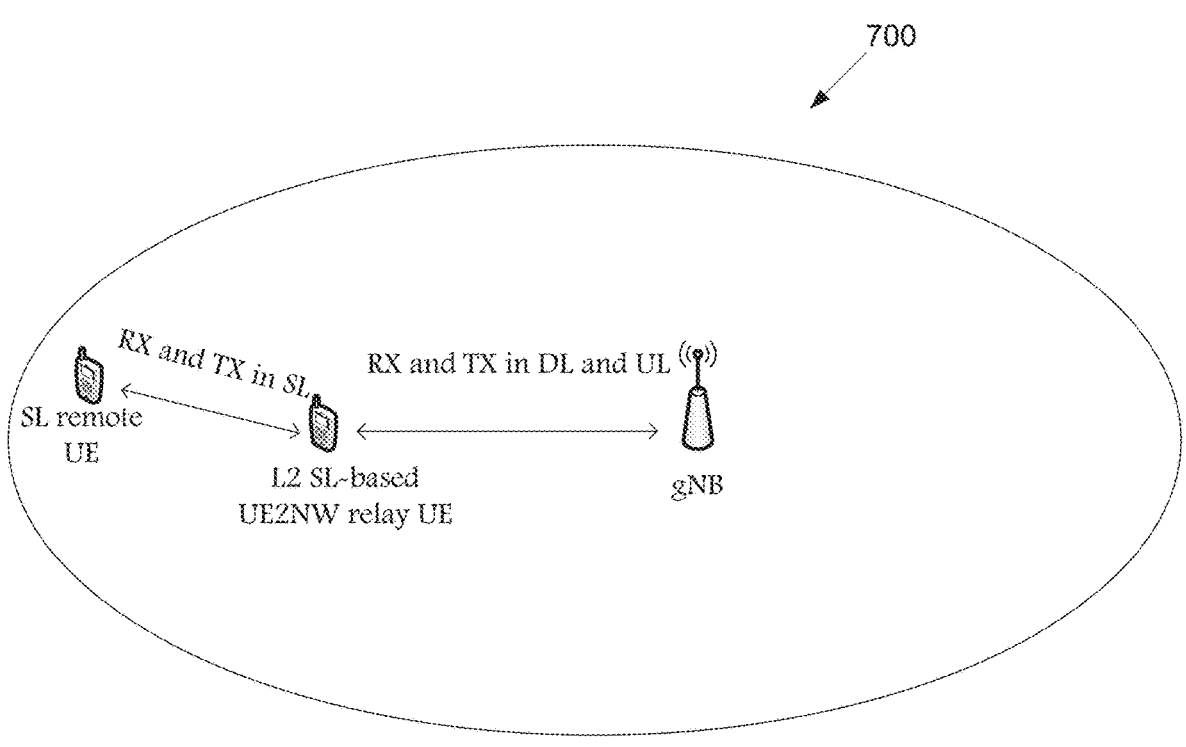
FIG. 7 illustrates an example of L2 SL-based UE-to-network relay scenario according to embodiments of the present disclosure.

FIG. 7 illustrates an example of L2 SL-based UE-to-network relay scenario 700 according to embodiments of the present disclosure. An embodiment of the L2 SL-based UE-to-network relay scenario 700 shown in FIG. 7 is for illustration only.

For an L2 UE-to-network relay, an adaptation layer is placed over a radio link control (RLC) sublayer for both CP and UP at the Uu interface between a relay UE and a gNB. The Uu service data adaptation protocol/packet data convergence protocol (SDAP/PDCP) and radio resource control (RRC) are terminated between a remote UE and a gNB, while RLC, MAC and PHY are terminated in each link (i.e., the link between a remote UE and a UE-to-network relay UE and the link between a UE-to-network relay UE and a gNB). Whether the adaptation layer is also supported at the PC5 interface between a remote UE and a relay UE is left to work item phase in 3GPP standardization (assuming down-selection first before studying too much on the detailed PC5 adaptation layer functionalities).

FIG. 8A illustrates an example L2 SL-based UE-to-network relay user plane protocol architecture 800 according to embodiments of the present disclosure. An embodiment of the L2 SL-based UE-to-network relay user plane protocol architecture 800 shown in FIG. 8A is for illustration only.

Figure 8B:
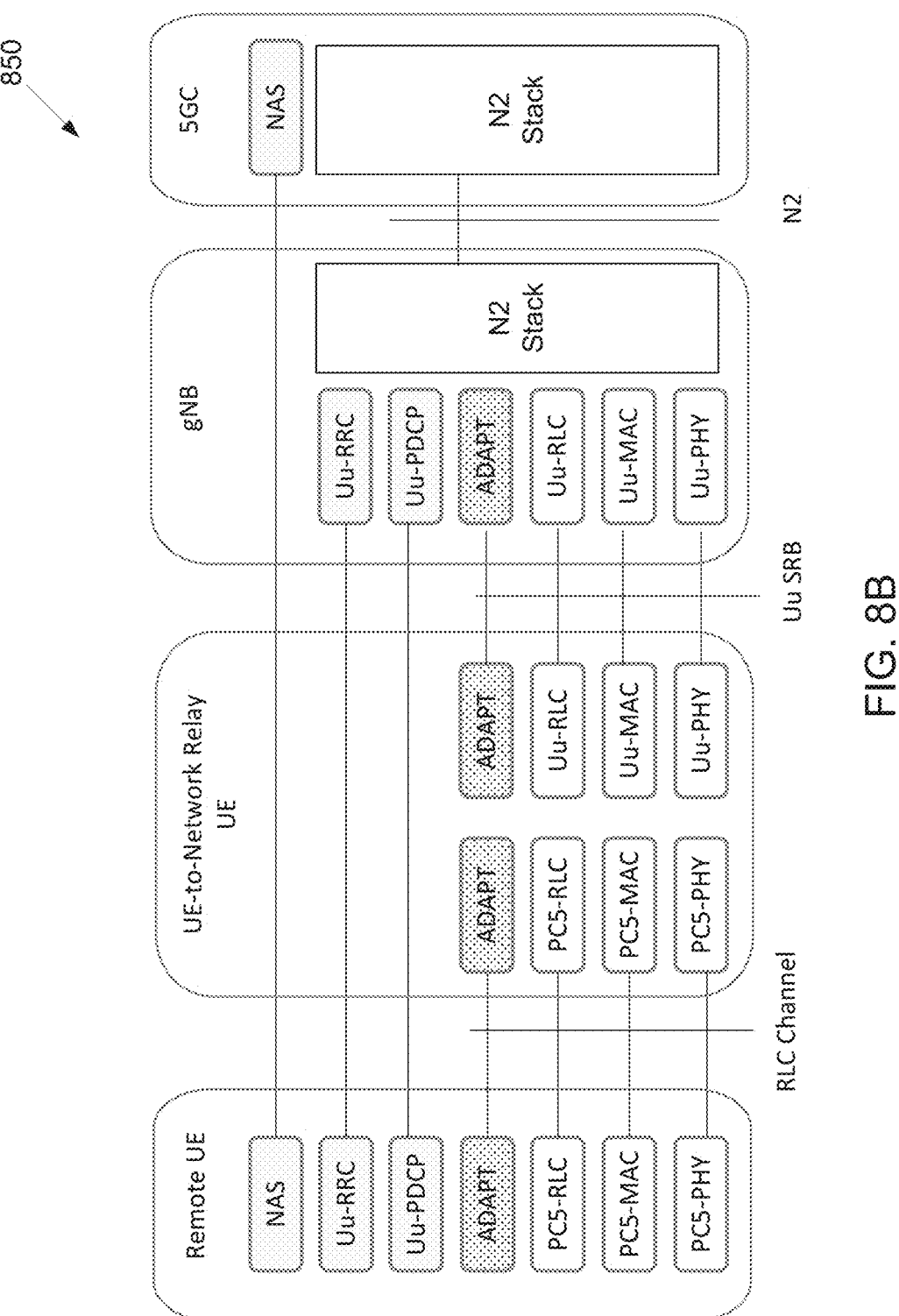
FIG. 8B illustrates an example L2 SL-based UE-to-network relay control plane protocol architecture according to embodiments of the present disclosure.

FIG. 8B illustrates an example L2 SL-based UE-to-network relay control plane protocol architecture 850 according to embodiments of the present disclosure. An embodiment of the L2 SL-based UE-to-network relay control plane protocol architecture 850 shown in FIG. 8B is for illustration only.

FIG. 8A and FIG. 8B illustrate an example of L2 SL-based UE2NW relay user plane and control plane protocol architectures. Note that FIG. 8A and FIG. 8B are described based on the assumption the adaptation layer is also supported at the PC5 interface, however the adaptation layer at the PC5 interface may be absent and depends on 3GPP standardization process.

For an L2 UE-to-network relay, in an uplink (1) a Uu adaptation layer at a relay UE supports a UL bearer mapping between ingress PC5 RLC channels for relaying and egress Uu RLC channels over the relay UE Uu path. For uplink relaying traffic, the different end-to-end RBs (SRB, DRB) of the same remote UE and/or different remote UEs can be subject to N:1 mapping and data multiplexing over one Uu RLC channel; and (2) a Uu adaptation layer is used to support a remote UE identification for the UL traffic (multiplexing the data coming from multiple Remote UE). The identity information of remote UE Uu radio bearer and a remote UE is included in the Uu adaptation layer at a UL in order for a gNB to correlate the received data packets for the specific PDCP entity associated with the right remote UE Uu radio bearer of a remote UE.

For L2 UE-to-network relay, for downlink (1) a Uu adaptation layer can be used to support a DL bearer mapping at a gNB to map end-to-end radio bearer (SRB, DRB) of remote UE into a Uu RLC channel over a relay UE Uu path. The Uu adaptation layer can be used to support DL N:1 bearer mapping and data multiplexing between multiple end-to-end radio bearers (SRBs, DRBs) of a remote UE and/or different remote UEs and one Uu RLC channel over the relay UE Uu path; (2) a Uu adaptation layer needs to support a remote UE identification for downlink traffic. The identity information of a remote UE Uu radio bearer and the identity information of a remote UE needs to be put into the Uu adaptation layer by a gNB at a DL in order for a relay UE to map the received data packets from remote UE Uu radio bearer to its associated PC5 RLC channel.

For a paging operation, an L2 SL-based UE2NW relay UE monitors the SL remote UE's paging frame (PF) and paging occasion (PO) in addition to its own PF(s) and PO(s), which is similar to the option 2 for FeD2D paging in 3GPP standard specification. Note that a formulae for PF and PO are specified in 3GPP standard specification. If the L2 SL-based UE2NW relay UE receives a paging message in the SL remote UE's paging occasion, the L2 SL-based UE2NW relay UE relays the paging message to the SL remote UE. Note that the PF is the frame where contains PO and PO is a slot where a paging signal is transmitted within the frame.

An L2 SL-based UE2NW relay UE may receive a short message in either its own PO(s) or SL remote UE's PO(s). The short message is transmitted on PDCCH using a paging-radio network temporary identification (P-RNTI) with or without associated paging message using a short message field in downlink control information (DCI) format 1_0. TABLE 1 shows short messages. In TABLE 1, a bit 1 is the most significant bit.

TABLE 1

Short message

| Bit | Short Message |
| --- | --- |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>This bit can be used for only operation with shared spectrum channel access and if nrofPDCCH-MonitoringOccasionPerSSB-InPO is present. If set to 1: indication that the UE may stop monitoring PDCCH occasion(s) for paging in this Paging Occasion as specified in TS 38.304 [20], clause 7.1. |
| 4-8 | Not used in this release of the specification, and may be ignored by UE if received. |

Since a short message is transmitted on PDCCH and the format of PDCCH and physical sidelink control channel (PSCCH) that is a physical control channel in an SL are quite different and they do not have compatibility, the L2 SL-based UE2NW relay UE cannot forward the received short message to the SL remote UE in the SL as it is.

FIG. 9 illustrates a signaling flow for SL-based UE-to-network relay operation 900 according to embodiments of the present disclosure. For example, the SL-based UE-to-network relay operation 900 may be performed by a UE (e.g., 111-116 as illustrated in FIG. 1) and a BS (e.g., 101-103 as illustrated in FIG. 1). An embodiment of the SL-based UE-to-network relay operation 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates one example of embodiments. The SL-based UE-to-network relay operation 900 is performed by an SL remote UE (901), an L2 SL-based UE2NW relay UE (903), and a serving gNB (905). Once the SL remote UE and the L2 SL-based UE2NW relay UE have an SL-RRC (or PC5-RRC) connection establishment, the SL remote UE informs the L2 SL-based UE2NW relay UE of the assistance information including the information of list of its interested system information block (SIB) and the information for the L2 SL-based UE2NW relay UE to calculate the SL remote UE's PO via an SL-RRC (e.g., PC5-RRC) message in step 911.

The assistance information for an SL remote UE's PO includes a discontinuous reception (DRX) cycle of the UE, a UE ID, and an index i_s. The DRX cycle of the UE is determined by the shortest of the UE specific DRX value(s) if the DRX cycle is configured by RRC and/or upper layers, and a default DRX value broadcast in system information. In an RRC idle state, if a UE specific DRX is not configured by upper layers, the default value is applied. The UE ID is determined by {5G-S-TMSI mod 1024} and the index i_s is determined by {floor (UE id/N) mod Ns}, where N is a number of total paging frames in the DRX cycle of the UE and Ns is a number of paging occasions for a PF.

The L2 SL-based UE2NW relay UE calculates the SL remote UE's PF(s) and PO(s) by using the received assistance information in step 911 and the formulae specified. Then the L2 SL-based UE2NW relay UE monitors its own PF(s) and PO(s) and the SL remote UE's PF(s) and PO(s) for the reception of short message and paging message in step 921. If the L2 SL-based UE2NW relay UE receives a short message in either its own PF(s) and PO(s) or the SL remote UE's PF(s) and PO(s) in step 931, the L2 SL-based UE2NW relay UE performs as follow in step 941.

In one example of Case 1, if a short message indicates systemInfoModification (if the most significant bit is set to 1), the L2 SL-based UE2NW relay UE acquires (updated/changed) system information blocks and relays the acquired (updated/changed) system information blocks to the SL remote UE via an SL if it was included in the list of SL remote UE's interested SIB and/or it has been updated/changed. Otherwise, no specific action is required from L2 SL-based UE2NW relay UE.

In one example of Case 2, if a short message indicates etwsAndCmasIndication (if the second most significant bit is set to 1), the L2 SL-based UE2NW relay UE acquires earthquake and tsunami warning system (ETWS)/commercial mobile alert service (CMAS) notification(s) and relays the ETWS/CMAS notification(s) to the remote UE via an SL if the corresponding SIB (e.g., SIB 6/SIB7 for ETWS, SIB8 for CMAS) was included in the list of SL remote UE's interested SIB. Note that one alternative is L2 SL-based UE2NW relay UE can relay the ETWS/CMAS notification(s) to the remote UE via SL regardless of the SL remote UE's interest.

In one example of Case 3, if a short message indicates stopPagingMonitoring (if the third most significant bit is set to 1), the L2 SL-based UE2NW relay UE stops monitoring PDCCH occasion(s) for paging in this PO.

Note that one alternative is that SL-RRC (PC5-RRC) message in step 911 may not include a list of SL remote UE's interested SIB and in this case, the L2 SL-based UE2NW relay UE always relays the acquired (updated/changed) system information blocks to the SL remote UE via the SL regardless of which SIB has been updated/changed in case 1), and the ETWS/CMAS notification(s) in case 2).

Figure 10:
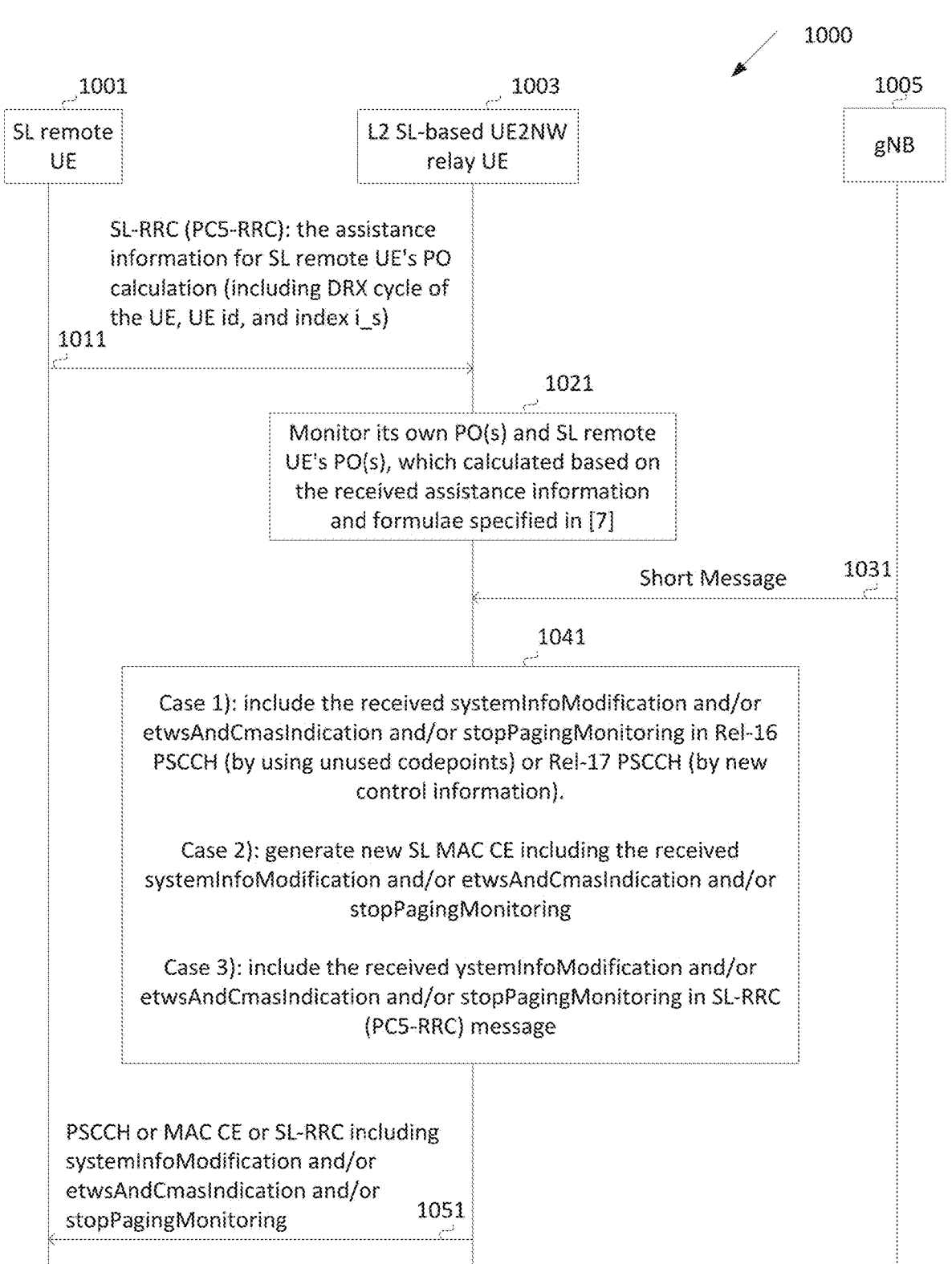
FIG. 10 illustrates another signaling flow for SL-based UE-to-network relay operation according to embodiments of the present disclosure.

FIG. 10 illustrates another signaling flow for SL-based UE-to-network relay operation 1000 according to embodiments of the present disclosure. For example, the SL-based UE-to-network relay operation 1000 may be performed by a UE (e.g., 111-116 as illustrated in FIG. 1) and a BS (e.g., 101-103 as illustrated in FIG. 1). An embodiment of the SL-based UE-to-network relay operation 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 illustrates another example of embodiments. AS illustrated in FIG. 10, an SL remote UE (1001), an L2 SL-based UE2NW relay UE (1003), and a serving gNB (1005) performs an operation. Once the SL remote UE and the L2 SL-based UE2NW relay UE have SL-RRC (or PC5-RRC) connection establishment, the SL remote UE informs the L2 SL-based UE2NW relay UE of the assistance information for L2 SL-based UE2NW relay UE to calculate the SL remote UE's PO (Paging Occasion) via SL-RRC (PC5-RRC) message in step 1011. The assistance information for SL remote UE's PO includes a DRX cycle of the UE, a UE ID, and an index i_s. DRX cycle of the UE is determined by the shortest of the UE specific DRX value(s) if configured by RRC and/or upper layers, and a default DRX value broadcast in system information.

In an RRC idle state, if the UE specific DRX is not configured by upper layers, the default value is applied. The UE ID is determined by {5G-S-TMSI mod 1024} and index i_s is determined by {floor (UE id/N) mod Ns}, where N is a number of total paging frames in DRX cycle of the UE and Ns is a number of paging occasions for a PF.

The L2 SL-based UE2NW relay UE calculates the SL remote UE's PF(s) and PO(s) by using the received assistance information in step 1011 and the formulae specified in 3GPP standard specification. Then the L2 SL-based UE2NW relay UE monitors its own PF(s) and PO(s) and the SL remote UE's PF(s) and PO(s) in 1021. If the L2 SL-based UE2NW relay UE receives a short message in either its own PF(s) and PO(s) or the SL remote UE's PF(s) and PO(s) in step 1031, the L2 SL-based UE2NW relay UE can inform the received information in the short message to the SL remote UE with the following alternatives in step 1041 and 1051.

In one embodiment of Alternative 1, the L2 SL-based UE2NW relay UE includes the received information (systemInfoModification and/or etwsAndCmasIndication and/or stopPagingMonitoring) in PSCCH and sends the PSCCH to the SL remote UE via an SL. This information can be included in Rel-16 PSCCH by using the unused/reserved code-points (e.g., if there is unused/reserved code-points in Rel-16 PSCCH, the first unused/reserved code-point indicates systemInfoModification, the second unused/reserved code-point indicates etwsAndCmasIndication, and so forth) or in Rel-17 PSCCH as newly defined physical control information.

In one embodiment of Alternative 2, the L2 SL-based UE2NW relay UE generates new SL MAC CE that includes the received information (systemInfoModification and/or etwsAndCmasIndication and/or stopPagingMonitoring) and sends it to the SL remote UE via SL.

In one embodiment of Alternative 3, the L2 SL-based UE2NW relay UE includes the received information (systemInfoModification and/or etwsAndCmasIndication and/or stopPagingMonitoring) in SL-RRC (PC5-RRC) message and sends the SL-RRC (PC5-RRC) message to the SL remote UE via SL.

The above signaling flow diagrams illustrate example methods that can be implemented in accordance with the principles of the present disclosure and various changes could be made to the methods illustrated in the signaling flow diagrams herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a first user equipment (UE) in a wireless communication system, the method comprising:

receiving, from a second UE via a sidelink channel, a message including a list for at least one requested system information block (SIB) for the second UE;

receiving, from a base station, a short message via physical downlink control channel (PDCCH);

acquiring, from the base station, one or more SIBs of the at least one requested SIB based on the short message and the list for the at least one requested SIB in the message, the one or more SIBs including at least one of: (i) at least one first SIB related to an earthquake and tsunami warning system/commercial mobile alert service (ETWS/CMAS) and (ii) at least one second SIB other than the at least one first SIB related to the ETWS/CMAS; and transmitting, to the second UE via the sidelink channel, the one or more SIBs.

2. The method of claim 1, wherein the at least one first SIB related to the ETWS/CMAS includes at least one ETWS notification or at least one CMAS notification.

3. The method of claim 2, wherein the at least one first SIB related to the ETWS/CMAS includes (i) a SIB6 or a SIB7 for the at least one ETWS notification and (ii) a SIB8 for the at least one CMAS notification.

4. The method of claim 1, wherein:

in case that the short message includes an indication of an ETWS/CMAS notification, the at least one first SIB is acquired, and in case that the short message includes indication of a system information modification other than a SIB6, a SIB7, or a SIB8, the at least one second SIB is acquired.

5. The method of claim 1, wherein the first UE is a UE-to-network relay UE and the second UE is a UE-to-network remote UE.

6. A first user equipment (UE) in a wireless communication system, the first UE comprising:

a processor; and a transceiver operably coupled to the processor, the transceiver configured to:

receive, from a second UE via a sidelink channel, a message including a list for at least one requested system information block (SIB) for the second UE, receive, from a base station, a short message via physical downlink control channel (PDCCH), acquire, from the base station, one or more SIBs of the at least one requested SIB based on the short message and the list for the at least one requested SIB in the message, the one or more SIBs including at least one of: (i) at least one first SIB related to an earthquake and tsunami warning system/commercial mobile alert service (ETWS/CMAS) and (ii) at least one second SIB other than the at least one first SIB related to the ETWS/CMAS, and transmit, to the second UE via the sidelink channel, the one or more SIBs.

7. The first UE of claim 6, wherein the at least one first SIB related to the ETWS/CMAS includes at least one ETWS notification or at least one CMAS notification.

8. The first UE of claim 7, wherein the at least one first SIB related to the ETWS/CMAS includes (i) a SIB6 or a SIB7 for the at least one ETWS notification and (ii) a SIB8 for the at least one CMAS notification.

9. The first UE of claim 6, wherein:

in case that the short message includes an indication of an ETWS/CMAS notification, the at least one first SIB is acquired, and in case that the short message includes indication of a system information modification other than a SIB6, a SIB7, or a SIB8, the at least one second SIB is acquired.

10. The first UE of claim 6, wherein the first UE is a UE-to-network relay UE and the second UE is a UE-to-network remote UE.

11. A wireless communication system comprising:

a first UE; and a second UE, wherein the first UE is configured to:

receive, from the second UE via a sidelink channel, a message including a list for at least one requested system information block (SIB) for the second UE, receive, from a base station, a short message via physical downlink control channel (PDCCH), acquire, from the base station, one or more SIBs of the at least one requested SIB based on the short message and the list for the at least one requested SIB in the message, and transmit, to the second UE via the sidelink channel, the one or more SIBs, wherein the second UE is configured to:

transmit, to the first UE via the sidelink channel, the message including the list for the at least one requested SIB for the second UE; and receive, from the first UE via the sidelink channel, the one or more SIBs of the at least one requested SIB, wherein the one or more SIBs includes at least one of (i) at least one first SIB related to an earthquake and tsunami warning system/commercial mobile alert service (ETWS/CMAS) and (ii) at least one second SIB other than the at least one first SIB related to the ETWS/CMAS.

12. The system of claim 11, wherein the at least one first SIB related to the ETWS/CMAS includes at least one ETWS notification or at least one CMAS notification.

13. The system of claim 12, wherein the at least one first SIB related to the ETWS/CMAS includes (i) a SIB6 or a SIB7 for the at least one ETWS notification and (ii) a SIB8 for the at least one CMAS notification.

14. The system of claim 11, wherein:

in case that the short message includes an indication of an ETWS/CMAS notification, the at least one first SIB is acquired, and in case that the short message includes indication of a system information modification other than a SIB6, a SIB7, or a SIB8, the at least one second SIB is acquired.

15. The system of claim 11, wherein the first UE is a UE-to-network relay UE and the second UE is a UE-to-network remote UE.

* * * * *